United States Patent
Obasih et al.

(10) Patent No.: US 9,070,958 B2
(45) Date of Patent: Jun. 30, 2015

(54) BATTERY SYSTEM HAVING AN EXTERNAL THERMAL MANAGEMENT SYSTEM

(75) Inventors: Kem Obasih, Brookfield, WI (US); Robert J. Mack, Milwaukee, WI (US); Gary P. Houchin-Miller, Milwaukee, WI (US); Jason D. Fuhr, Sussex, WI (US); Richard M. DeKeuster, Racine, WI (US)

(73) Assignee: Johnson Controls Technology LLC, Wilmington, DE (US)

( * ) Notice: Subject to any disclaimer, the term of this patent is extended or adjusted under 35 U.S.C. 154(b) by 7 days.

(21) Appl. No.: 13/445,244

(22) Filed: Apr. 12, 2012

(65) Prior Publication Data

US 2012/0263988 A1    Oct. 18, 2012

Related U.S. Application Data

(60) Provisional application No. 61/476,195, filed on Apr. 15, 2011.

(51) Int. Cl.
| | | |
|---|---|---|
| *H01M 10/50* | (2006.01) | |
| *H01M 10/613* | (2014.01) | |
| *H01M 10/6554* | (2014.01) | |
| *H01M 10/6556* | (2014.01) | |
| H01M 10/625 | (2014.01) | |

(Continued)

(52) U.S. Cl.
CPC ...... *H01M 10/5004* (2013.01); *H01M 10/5016* (2013.01); *H01M 10/5032* (2013.01); *H01M 10/504* (2013.01); *H01M 10/5053* (2013.01); *H01M 10/5057* (2013.01); *H01M 2220/20* (2013.01)

(58) Field of Classification Search
CPC ......... H01M 10/5004; H01M 2/0217; H01M 2/1061; H01M 6/5038; H01M 10/5016; H01M 10/5053
USPC .......................... 429/120, 163, 170, 175, 186
See application file for complete search history.

(56) References Cited

U.S. PATENT DOCUMENTS

| | | | | |
|---|---|---|---|---|
| 5,358,426 | A | * 10/1994 | Henschen et al. | ............. 439/497 |
| 5,542,489 | A | * 8/1996 | Allison et al. | ................ 180/68.5 |
| 6,569,559 | B1 | * 5/2003 | Rouillard et al. | ............. 429/120 |

(Continued)

FOREIGN PATENT DOCUMENTS

| | | |
|---|---|---|
| DE | 102008010825 A1 | 8/2009 |
| DE | 102008010828 A1 | 8/2009 |

(Continued)

OTHER PUBLICATIONS

International Search Report and Written Opinion for PCT No. PCT/US2012/033316 dated Jul. 13 2012; 14 pages.

*Primary Examiner* — Ula C Ruddock
*Assistant Examiner* — Scott J Chmielecki
(74) *Attorney, Agent, or Firm* — Fletcher Yoder, P.C.

(57) ABSTRACT

Battery systems and modules having external thermal management systems are provided. In one embodiment, a battery module includes a housing and at least one electrochemical cell disposed within the housing. The battery module also includes a thermal interface having a first side in contact with the at least one electrochemical cell. The battery module also includes a heat sink in contact with a second side of the thermal interface. The thermal interface is adapted to enable heat transfer from the at least one electrochemical cell to the heat sink.

13 Claims, 11 Drawing Sheets

(51) Int. Cl.
*H01M 10/647* (2014.01)
*H01M 10/653* (2014.01)

(56) References Cited

U.S. PATENT DOCUMENTS

| | | | |
|---|---|---|---|
| 8,113,271 B2 * | 2/2012 | Fuhst et al. | 166/55.7 |
| 8,119,271 B1 * | 2/2012 | Bruce et al. | 429/100 |
| 2005/0026014 A1 * | 2/2005 | Fogaing et al. | 429/26 |
| 2005/0133212 A1 | 6/2005 | Wilson et al. | |
| 2007/0285052 A1 * | 12/2007 | Jeon et al. | 320/112 |
| 2009/0017366 A1 | 1/2009 | Wood et al. | |
| 2009/0111015 A1 | 4/2009 | Wood et al. | |
| 2009/0155675 A1 | 6/2009 | Houchin-Miller | |
| 2010/0047682 A1 | 2/2010 | Houchin-Miller et al. | |
| 2010/0104927 A1 * | 4/2010 | Albright | 429/50 |
| 2010/0188934 A1 * | 7/2010 | Qian et al. | 367/140 |
| 2010/0279154 A1 | 11/2010 | Koetting et al. | |
| 2011/0189523 A1 * | 8/2011 | Eom | 429/120 |
| 2011/0244286 A1 | 10/2011 | Fuhr et al. | |
| 2011/0244299 A1 * | 10/2011 | Guener et al. | 429/120 |
| 2011/0269008 A1 | 11/2011 | Houchin-Miller et al. | |
| 2012/0003522 A1 | 1/2012 | Fuhr et al. | |
| 2012/0148889 A1 | 6/2012 | Fuhr et al. | |
| 2012/0164496 A1 * | 6/2012 | Lachenmeier et al. | 429/61 |
| 2012/0164508 A1 | 6/2012 | Houchin-Miller et al. | |

FOREIGN PATENT DOCUMENTS

| | | |
|---|---|---|
| DE | 102008054947 A1 | 6/2010 |
| DE | 102009004543 A1 | 7/2010 |
| DE | 102009008222 A1 | 8/2010 |
| DE | 102010029872 A1 | 1/2011 |
| DE | 102009028920 A1 | 3/2011 |
| DE | 102009038404 A1 | 3/2011 |
| WO | 2009061090 A1 | 5/2009 |
| WO | WO 2010066637 A1 * | 6/2010 |
| WO | 2010108885 A1 | 9/2010 |
| WO | 2010136863 A1 | 12/2010 |

* cited by examiner

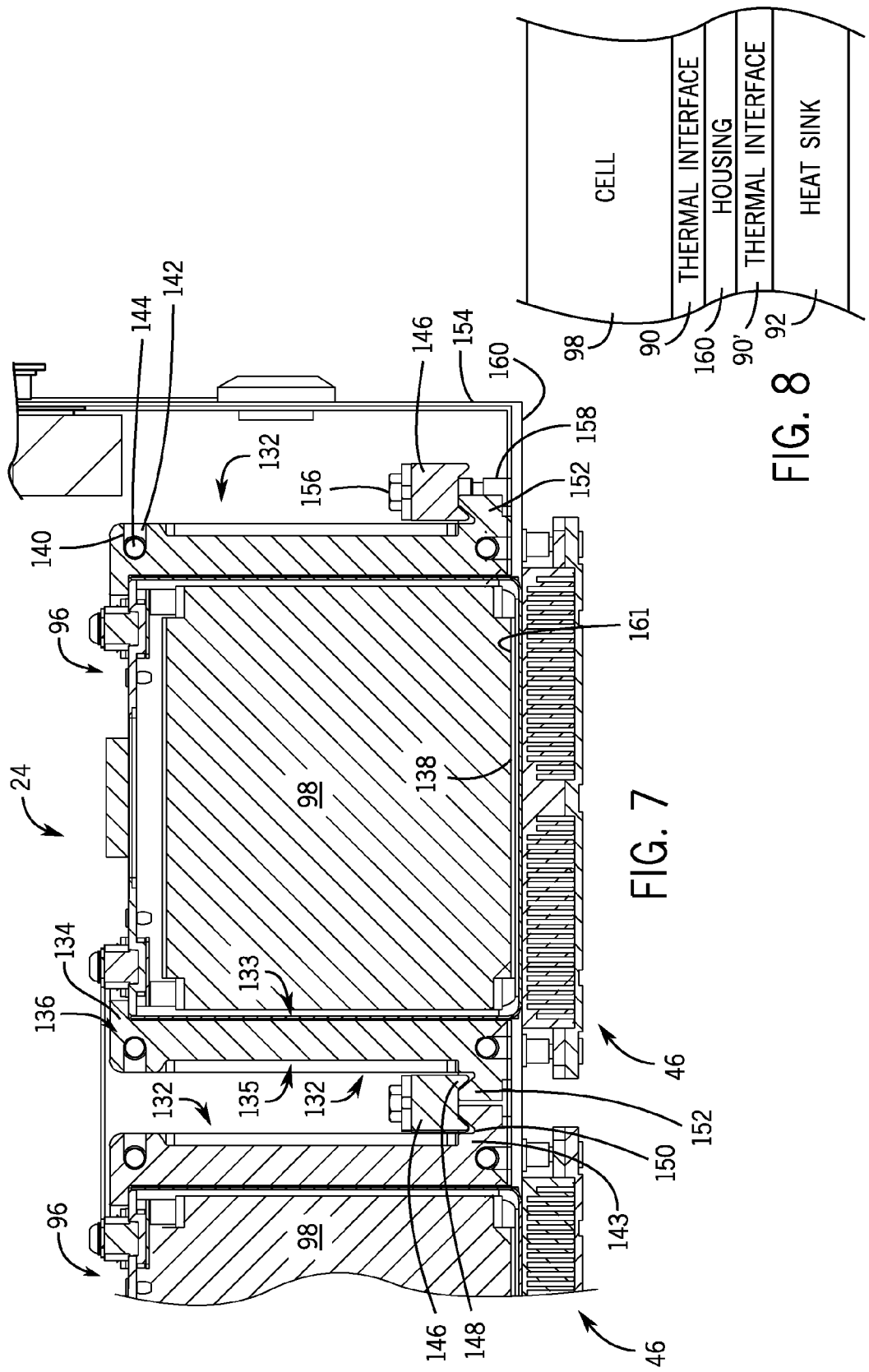

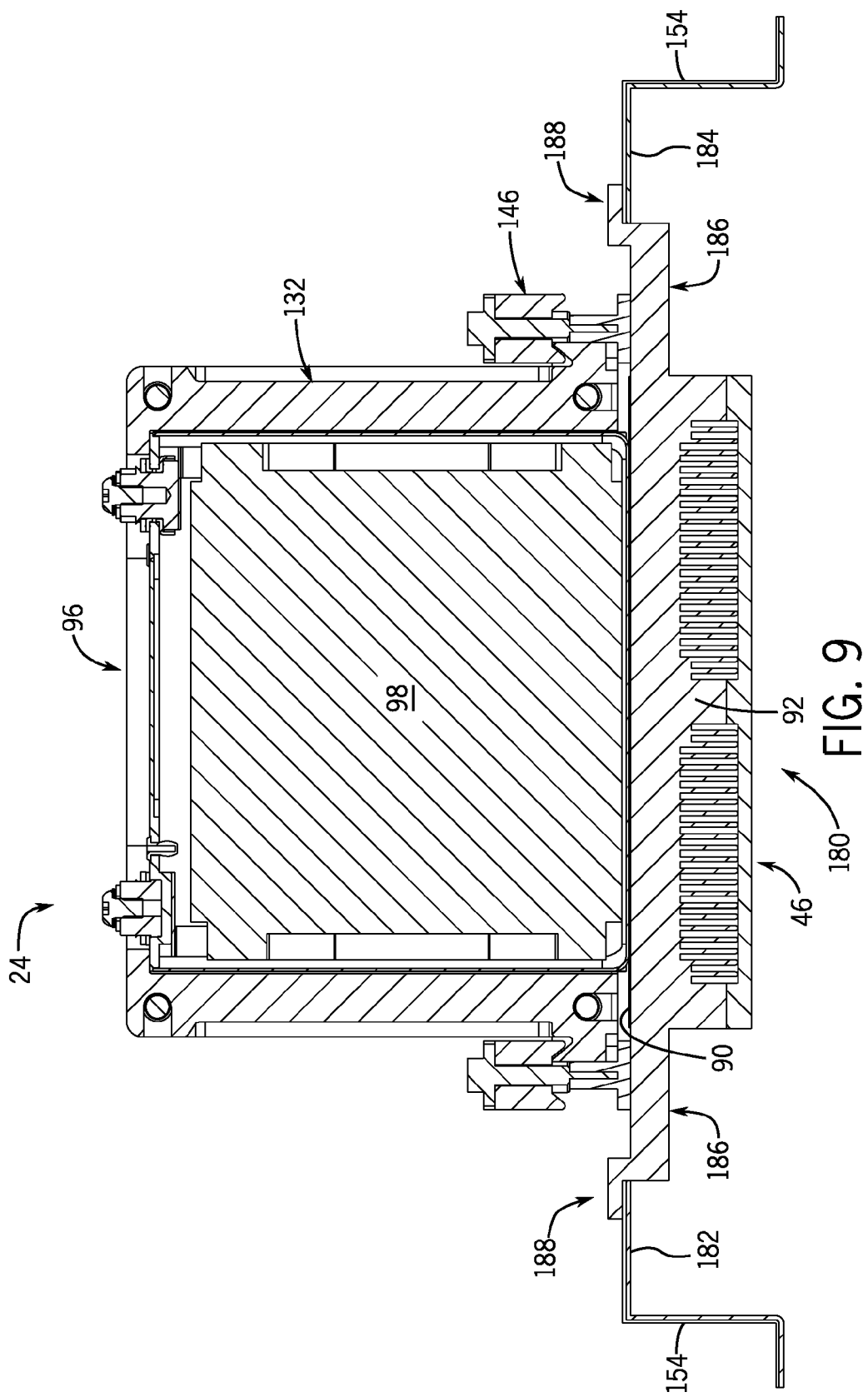

BATTERY SYSTEM HAVING AN EXTERNAL THERMAL MANAGEMENT SYSTEM

CROSS REFERENCE TO RELATED APPLICATIONS

This application claims priority from and the benefit of U.S. Provisional Application Ser. No. 61/476,195, entitled "Battery System Having an External Thermal Management System," filed Apr. 15, 2011, which is hereby incorporated by reference.

FIELD OF THE DISCLOSURE

The present application relates generally to the field of batteries and battery systems and, more specifically, to batteries and battery systems having external thermal management systems.

BACKGROUND

Vehicles using electric power for all or a portion of their motive power (e.g., electric vehicles (EVs), hybrid electric vehicles (HEVs), plug-in hybrid electric vehicles (PHEVs), and the like, collectively referred to as "electric vehicles"), may provide a number of advantages as compared to more traditional gas-powered vehicles using internal combustion engines. For example, electric vehicles may produce fewer undesirable emission products and may exhibit greater fuel efficiency as compared to vehicles using internal combustion engines (and, in some cases, such vehicles may eliminate the use of gasoline entirely, such as in certain types of PHEVs). As electric vehicle technology continues to evolve, there is a need to provide improved power sources, such as battery systems or modules, for such vehicles. For example, it is desirable to increase the distance that such vehicles may travel without the need to recharge the batteries. It is also desirable to improve the performance of such batteries and to reduce the cost associated with the battery systems.

While early electric vehicle systems often employed nickel-metal-hydride (NiMH) batteries as a propulsion source, many current systems use improved battery chemistries, such as lithium-ion batteries, to provide the motive power for the associated vehicle. The use of newer battery chemistries and the desire to enhance performance of electric vehicles have given rise to new design and engineering challenges. For example, lithium-ion batteries may be more susceptible to variations in battery temperature than comparable NiMH batteries, and thus, many lithium-ion based battery systems may utilize internal temperature regulating systems to regulate the temperatures of the lithium-ion batteries during vehicle operation. However, inclusion of the temperature regulating systems within the battery systems has led to a variety of disadvantages, such as leakage and condensation-related operational challenges. Accordingly, it would be desirable to provide an improved battery module and/or system for use in electric vehicles that addresses one or more challenges associated with the utilization of battery systems in such vehicles.

SUMMARY

In one embodiment, a battery system includes an enclosure having a heat transfer side wall and a battery module disposed within the enclosure and having at least one electrochemical cell. The battery system also includes a thermal interface in contact with the at least one electrochemical cell and an inside surface of the heat transfer side wall. The battery system also includes a heat sink disposed on an outside of the heat transfer side wall.

In another embodiment, a battery system includes a battery module. The battery module includes a housing and at least one electrochemical cell disposed within the housing. The battery module also includes a thermal interface having a first side in contact with the at least one electrochemical cell. The battery module further includes a heat sink in contact with a second side of the thermal interface. The thermal interface is adapted to enable heat transfer from the at least one electrochemical cell to the heat sink.

In another embodiment, a battery system includes an enclosure having a heat transfer side wall and an aperture disposed therein. The battery system also includes a battery module having at least one electrochemical cell and a thermal interface having an inner surface in contact with the at least one electrochemical cell. A heat sink is disposed on an outside surface of the thermal interface and is adapted to receive heat from the battery module via the thermal interface. The heat sink, the thermal interface, and the battery module are adapted to be received in the aperture of the enclosure.

DRAWINGS

FIG. 7 is a sectional view of the battery system of FIG. 3 according to an embodiment;

FIG. 8 illustrates an embodiment of a heat transfer interface that enables transfer of heat within the battery system of FIG. 7;

FIG. 9 is a sectional view of an embodiment of a battery system according to an embodiment;

DETAILED DESCRIPTION

Figure 1:
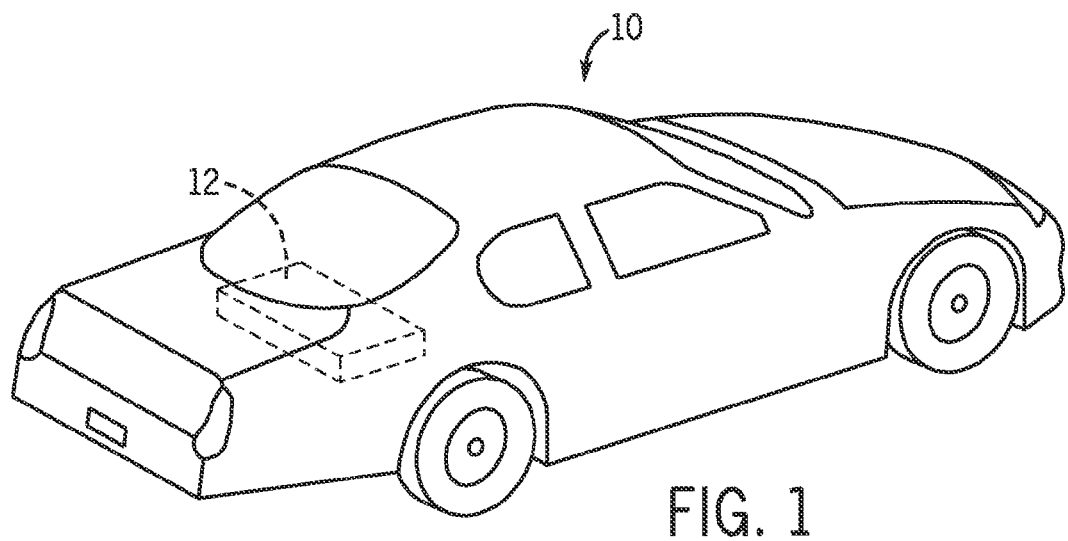
FIG. 1 is perspective view of an embodiment of a vehicle having a battery system for providing all or a portion of the motive power for the vehicle.

Turning now to the drawings, FIG. 1 is a perspective view of a vehicle 10 in the form of an automobile (e.g., a car) having a battery system 12 for providing all or a portion of the motive power for the vehicle 10. In some embodiments, the vehicle 10 may be an electric vehicle (EV), a hybrid electric vehicle (HEV), a plug-in hybrid electric vehicle (PHEV), or any other type of vehicle using electric power for propulsion (collectively referred to as "electric vehicles"). Additionally, although illustrated as a car in FIG. 1, the type of the vehicle 10 may be implementation-specific, and, accordingly, may differ in other embodiments, all of which are intended to fall within the scope of the present disclosure. For example, the vehicle 10 may be a truck, bus, industrial vehicle, motorcycle, recreational vehicle, boat, or any other type of vehicle that may benefit from the use of electric power for all or a portion of its propulsion power.

For the purposes of the present disclosure, it should be noted that the battery modules and systems illustrated and described herein are particularly directed to applications in providing and/or storing energy in xEV electric vehicles. As will be appreciated by those skilled in the art, hybrid electric vehicles (HEVs) combine an internal combustion engine propulsion and high voltage battery power to create traction. A plug-in electric vehicle (PEV) is any vehicle that can be charged from an external source of electricity, such as wall sockets, and the energy stored in the rechargeable battery packs drives or contributes to drive the wheels. PEVs are a subcategory of electric vehicles that include all-electric or battery electric vehicles (BEVs), plug-in hybrid vehicles (PHEVs), and electric vehicle conversions of hybrid electric vehicles and conventional internal combustion engine vehicles. An electric vehicle (EV) is an all-electric vehicle that uses for its propulsion one or more motors powered by electric energy. The term "xEV" is defined herein to include all of the foregoing or any variations or combinations thereof that include electric power as a motive force.

Further, although the battery system 12 is illustrated in FIG. 1 as being positioned in the trunk or rear of the vehicle 10, according to other exemplary embodiments, the location of the battery system 12 may differ. For example, the position of the battery system 12 may be selected based on the available space within the vehicle 10, the desired weight balance of the vehicle 10, the location of other components used with the battery system (e.g., battery management systems, vents or cooling devices, etc.), and a variety of other implementation-specific considerations.

Figure 2:
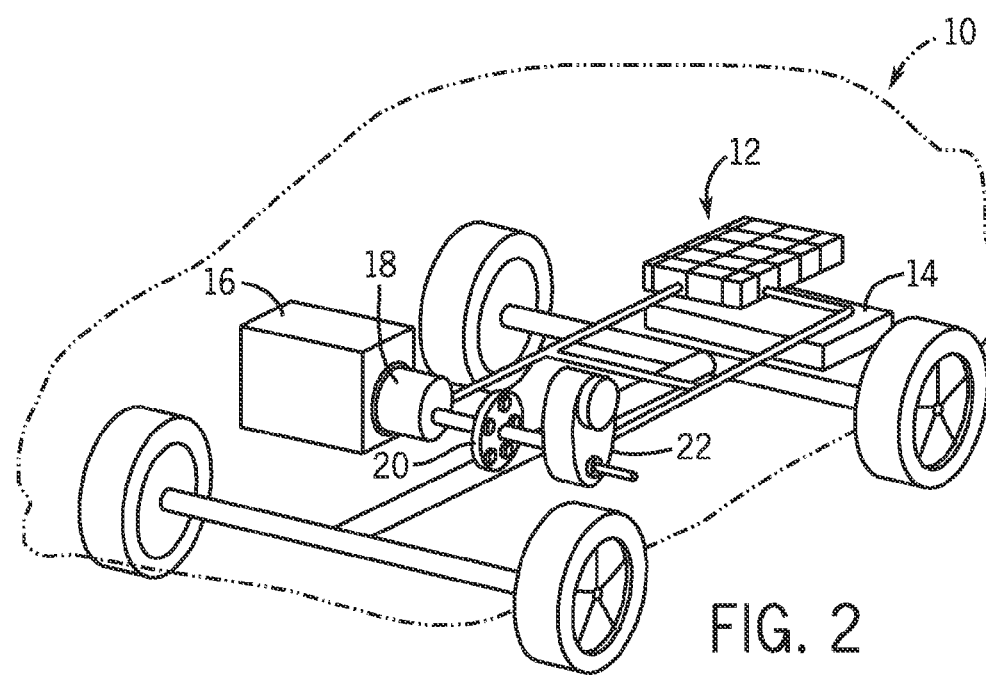
FIG. 2 illustrates a cutaway schematic view of an embodiment of the vehicle of FIG. 1 provided in the form of a hybrid electric vehicle.

FIG. 2 illustrates a cutaway schematic view of the vehicle 10 provided in the form of an HEV according to a presently disclosed embodiment. In the illustrated embodiment, the battery system 12 is provided toward the rear of the vehicle 10 proximate a fuel tank 14. However, in other embodiments, the battery system 12 may be provided immediately adjacent the fuel tank 14 or may be provided in a separate compartment in the rear of the vehicle 10 (e.g., a trunk) or may be provided elsewhere in the vehicle 10. An internal combustion engine 16 is provided for times when the HEV utilizes gasoline power to propel the vehicle 10. An electric motor 18, a power split device 20, and a generator 22 are also provided as part of the vehicle drive system. Such an HEV may be powered or driven by just the battery system 12, by just the engine 16, or by both the battery system 12 and the engine 16. It should be noted that other types of vehicles and configurations for the vehicle electrical system may be used according to other embodiments, and that the schematic illustration of FIG. 2 should not be considered to limit the scope of the subject matter described in the present application. Indeed, according to various other embodiments, the size, shape, and location of the battery system 12, the type of vehicle 10, the type of vehicle technology (e.g., EV, HEV, PHEV, etc.), and the battery chemistry, among other features, may differ from those shown or described.

According to an embodiment, the battery system 12 is responsible for packaging or containing electrochemical cells or batteries, connecting the electrochemical cells to each other and/or to other components of the vehicle electrical system, and regulating the electrochemical cells and other features of the battery system 12. For example, the battery system 12 may include features that are responsible for monitoring and controlling the electrical performance of the system, managing the thermal behavior of the system, containment and/or routing of effluent (e.g., gases that may be vented from a battery cell), and other aspects of the battery system, as described in more detail below.

According to one embodiment, the battery system 12 may include one or more battery modules that contain individual electrochemical cells or batteries. The battery system 12 may also include features or components for connecting the electrochemical cells to each other and/or to other components of the vehicle electrical system, and also for regulating the electrochemical cells and other features of the battery system. For example, the battery system may include features that are responsible for monitoring and controlling the electrical performance of the system, managing the thermal behavior of the system, containment and/or routing of effluent (e.g., gases that may be vented from a battery cell), and other aspects of the battery system. For further example, in some embodiments, the battery system 12 may include one or more battery modules having an external thermal management system that either passively or actively enables heat transfer from the electrochemical cells to an associated heat sink during operation, as discussed in more detail below.

Figure 3:
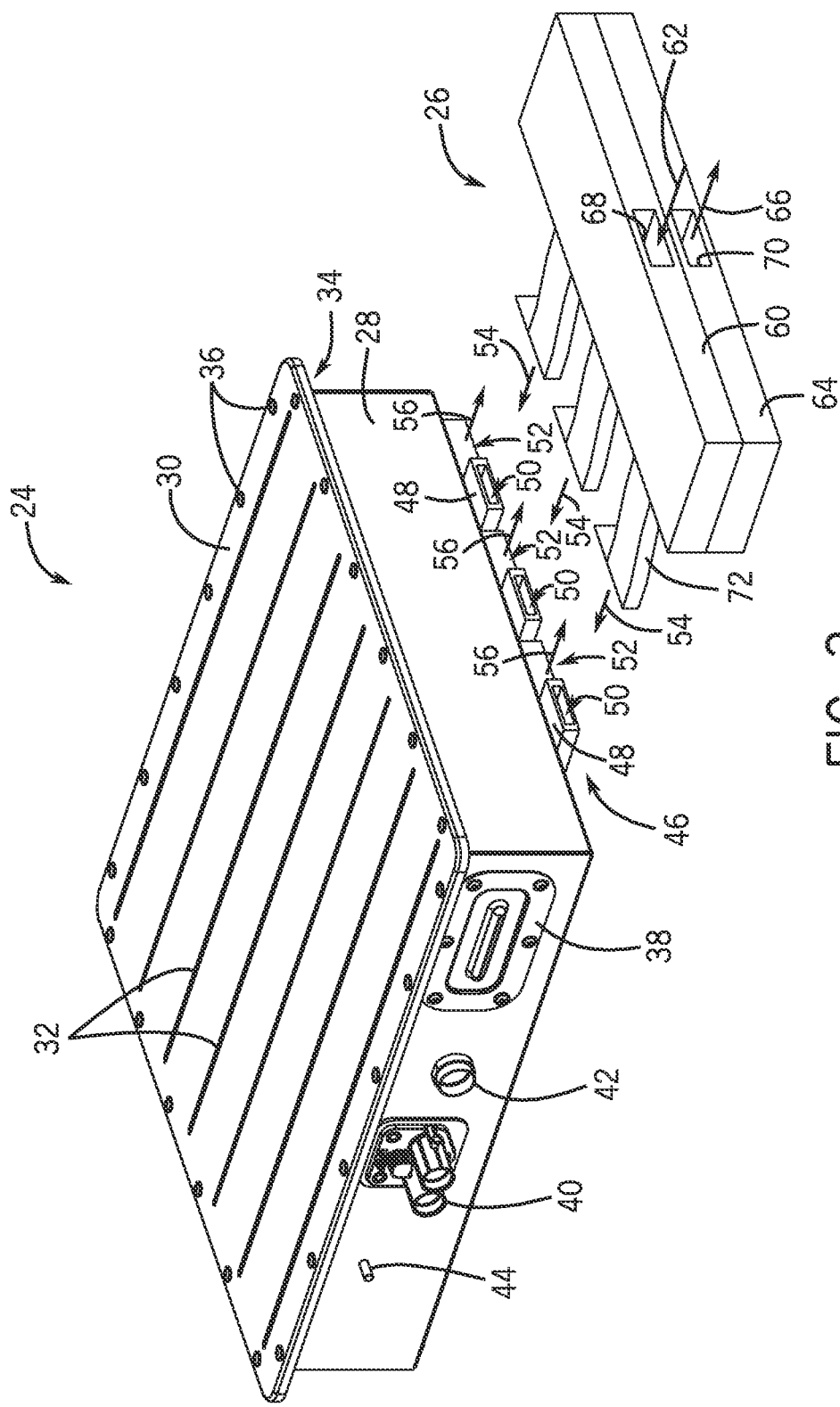
FIG. 3 is a perspective view of a battery system having an external thermal management system and a manifold in accordance with an embodiment.

Referring now to FIG. 3, an embodiment of a battery system 24 and an associated manifold 26 are shown. In certain embodiments, the foregoing system may be provided in the trunk of a vehicle, under the front or back seats of the vehicle, on the underside of the chassis of the vehicle, or in any other suitable position of the vehicle, depending on a variety of implementation-specific considerations. Indeed, it should be noted that one of ordinary skill in the art would readily recognize that many other locations of the battery system within or underneath the vehicle are possible and that the locations stated above are provided merely as examples.

In the embodiment illustrated in FIG. 3, the battery system 24 includes a base or housing 28 and a lid or cover 30 that are coupled together, for example, with fasteners such as bolts or screws, to enclose one or more battery modules. In the illustrated embodiment, the cover 30 includes support ribs 32 that may be provided to aid in increasing the rigidity of the cover 30. However, according to other embodiments, the cover 30 may not include the support ribs 32.

As shown, the cover 30 couples to the housing 28 to substantially enclose all of the battery modules and various system components within the housing 28. The illustrated housing 28 and cover 30 each include a flange 34 or perimeter that is complementary to one another. A plurality of apertures in the housing 28 are adapted to receive a fastener 36, such as a bolt or screw. In some embodiments, a sealing member may be provided between the flanges of the housing 28 or the cover 30 to aid in the sealing of the battery system 24. When the cover 30 and housing 28 are properly coupled together, they may present a leak tight structure to keep water and other fluids from penetrating into the battery system 24 and to also keep gases or fluids (e.g., vented gases and/or electrolyte from the cells) within the battery system 24.

It should be noted that the housing 28 and the cover 30 may be constructed from any suitable materials. For example, the housing 28 and the cover 30 may be constructed from a metal such as aluminum, an alloy such as an aluminum alloy, steel, or any other suitable material. For example, according to other embodiments, the housing 28 and the cover 30 may be constructed from other suitable materials, such as an electrically insulative material (e.g., a polymer, a glass-filled polymer, etc.).

The battery system 24 also includes a cover 38 for a service disconnect for the battery system 24. The service disconnect, when actuated by a user, disconnects a portion of the battery modules from one another, thus lowering the overall voltage potential of the battery system 24 to allow the user to service and/or perform maintenance on the battery system 24. Still further, the illustrated battery system 24 also includes several electrical connectors, such as a high voltage connector 40, a low voltage connector 42, and a grounding stud 44. In embodiments in which the battery system 24 is utilized within a vehicle, the high voltage connector 40 is used to connect the power output of the battery system 24 to the vehicle power system. In such embodiments, the low voltage connector 42 is used to connect the electronics and control circuits of the battery system 24 with a vehicle control system. The grounding stud 44 serves as a connection point to connect the battery system 24 to ground.

Still further, in the illustrated embodiment, the battery system 24 includes a thermal management system 46 that is external to the housing 28 of the battery system 24. According to the illustrated embodiment, a heat transfer device 48 includes a plurality of inbound passageways 50 and a plurality out outbound passageways 52. As shown by arrows 54, a thermal management fluid (e.g., air, liquid, etc.) is routed into the heat transfer device 48 through the inbound passageways and, once heat is transferred to the thermal management fluid from the battery system 24, is subsequently routed out of the heat transfer device 48 via the outbound passageways 52, as indicated by arrows 56. Within the heat transfer device 48, heat is transferred from the cells within the housing 28 of the battery system 24 and to the thermal management fluid. The passages of the thermal management device may be provided in any suitable type of heat sink, for example, within tubes or conduits, within a thermal plate, or within any other suitable structure.

As previously mentioned, according to certain embodiments, the passages 50 and 52 are configured to receive a thermal management fluid therethrough to cool or heat the cells (e.g., via conduction thermal transfer). The thermal management fluid may be any suitable fluid, such as a gas such as air or a liquid such as a coolant (e.g., water, water/glycol mixture, refrigerant, etc.). Further, in the illustrated embodiment, the thermal management system 46 is provided below each battery module of the battery system 24 on an exterior side of the housing 28 of the battery system 24, and the thermal management fluid passes directly underneath the cells of the battery module to enable thermal heat transfer to occur efficiently and effectively. However, in an alternative embodiment, the thermal management system 46 may be replaced by any other suitable thermal management feature, for example, by a device that covers the entire (or substantially the entire) bottom of the battery system 24.

In the illustrated embodiment, the manifold 26 is provided adjacent the thermal management system 46. As shown in FIG. 3, the manifold 26 has an inlet portion 60 through which fluid flows into the manifold 26, as indicated by arrow 62, and an outlet portion 64 through which fluid flows out of the manifold 26, as indicated by arrow 66. According to one embodiment, the inlet portion 60 includes an opening 68 configured to receive a single source of thermal management fluid. The inlet portion 60 also has multiple channels or ducts 72 configured to route the thermal management fluid to the inlets of the thermal management system 46. Likewise, the outlet portion 64 of the manifold 26 includes an opening 70 configured to return the thermal management fluid from multiple channels or ducts 74. These ducts may have openings that correspond to the outlets of the thermal management system 46.

It should be noted that in some embodiments, the battery system 24 may include a fan or pump (not shown) to move the fluid through the thermal management system 46 and/or the manifold 26. For example, a fan or pump may be located in front of the inlet portion 60 of the manifold 26 to push the fluid through the system. According to another embodiment, the fan or pump may be located behind the outlet portion 64 of the manifold 26 to pull the fluid through the system.

Still further, in some embodiments, multiple fans or pumps may be employed to push or pull the fluid through the thermal management system 46. One advantage of this embodiment is that the individual fans or pumps can be sized smaller than the single fan or pump used for the entire system, thus creating less overall noise for the system. According to another embodiment, individual fans or pumps may be provided in or adjacent the connection members of the battery modules so that the fans or pumps are pulling the fluid through the first half of the thermal management device and pushing the fluid through the second half of the thermal management device. In this case, the noise created by the fans or pumps may be further reduced, as the fans may be subjected to a reduced pressure drop across the thermal management device. Also, the fans or pumps may be located inside the thermal management device to further quiet any fan or pump noise produced.

According to another embodiment, the thermal management fluid may come from the air from the cabin of the vehicle in which the battery system 24 is provided. According to this embodiment, the air is routed from the cabin of the vehicle and through the thermal management system 46 of the battery system 24 (or vice versa). The air would be cooled by the air conditioning system of the vehicle if cooling was needed, or heated by the heating system of the vehicle if heating was needed.

According to another embodiment, the thermal management fluid may come from air surrounding the outside of the thermal management system 46 (e.g., atmospheric air). According to another embodiment, air from the atmosphere is configured to be routed through the thermal management system 46 when the vehicle is moving (e.g., air cooling or heating). According to another embodiment, the thermal management system 46 may include a Peltier effect cooler or heater.

Figure 4:
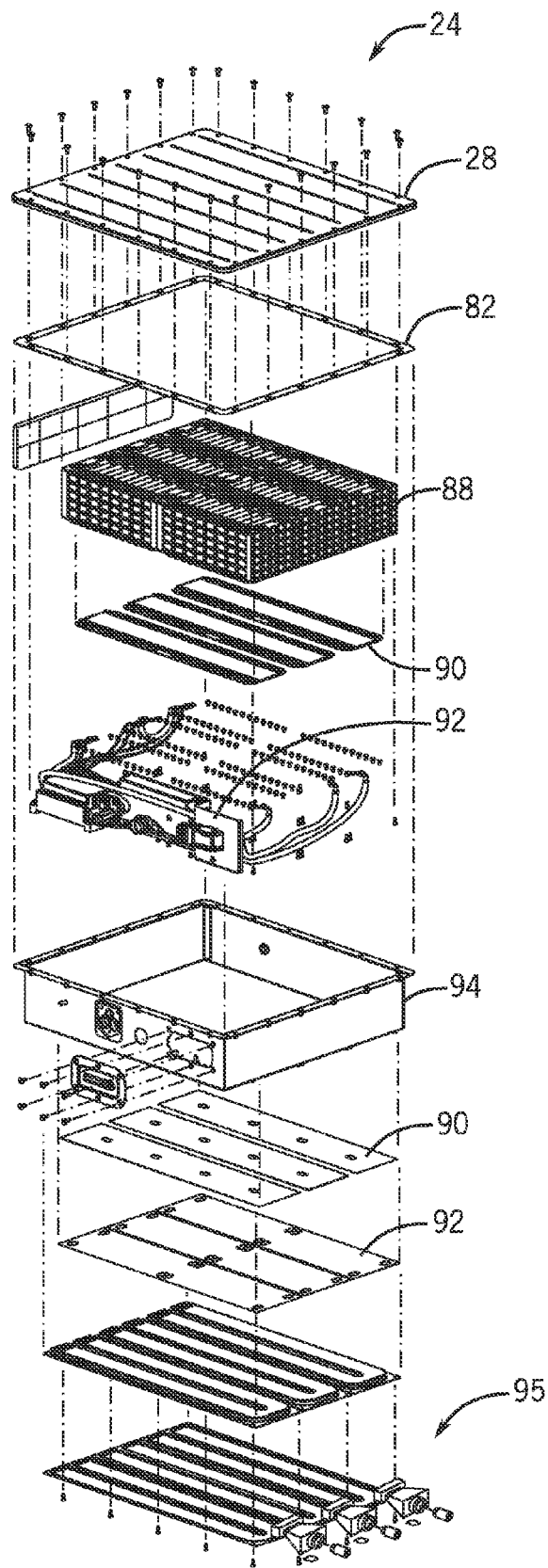
FIG. 4 is a partial exploded view of an embodiment of the battery system of FIG. 3.

FIG. 4 is an exploded view of an embodiment of the battery system 24 illustrating internal components of the battery system 24. However, it should be noted that the illustrated components are merely examples, and in other embodiments, more or fewer components may be included. In the illustrated embodiment, the battery system 24 includes a cover 80, a seal 82, a cell supervisory controller (CSC) board assembly 84, a clamping bar 86, an assembly 88 of battery modules, thermal interfaces shown in FIG. 4 as thermally conductive pads 90, electronics and wiring 92, and lower housing 94. In this embodiment, the thermal management system 46 includes a heat sink 92 and a heat sink assembly 95.

During operation of the battery system 24, the plurality of CSCs in the assembly 84 are configured to monitor and/or regulate at least a portion of the individual cells of the battery modules in the assembly 88. According to an embodiment, each CSC may be mounted on a member or trace board (e.g., a printed circuit board). The trace board includes the necessary wiring to connect the CSC to the individual cells and to connect the CSC to the battery management system (BMS) or electronic control unit (ECU) of the battery system. The trace board includes various connectors to make these connections possible (e.g., temperature connectors, electrical connectors, voltage connectors, etc.).

In certain embodiments, a single CSC may be associated with each individual battery module. However, according to other embodiments, the CSCs may be otherwise connected to other modules and/or cells. According to one embodiment, each CSC may be located adjacent the specific module with which it is associated (e.g., adjacent an end, top or side of the module). However, according to other embodiments, the CSCs may be otherwise located (e.g., away from the modules, either within or outside the housing of the battery system).

Figure 5:
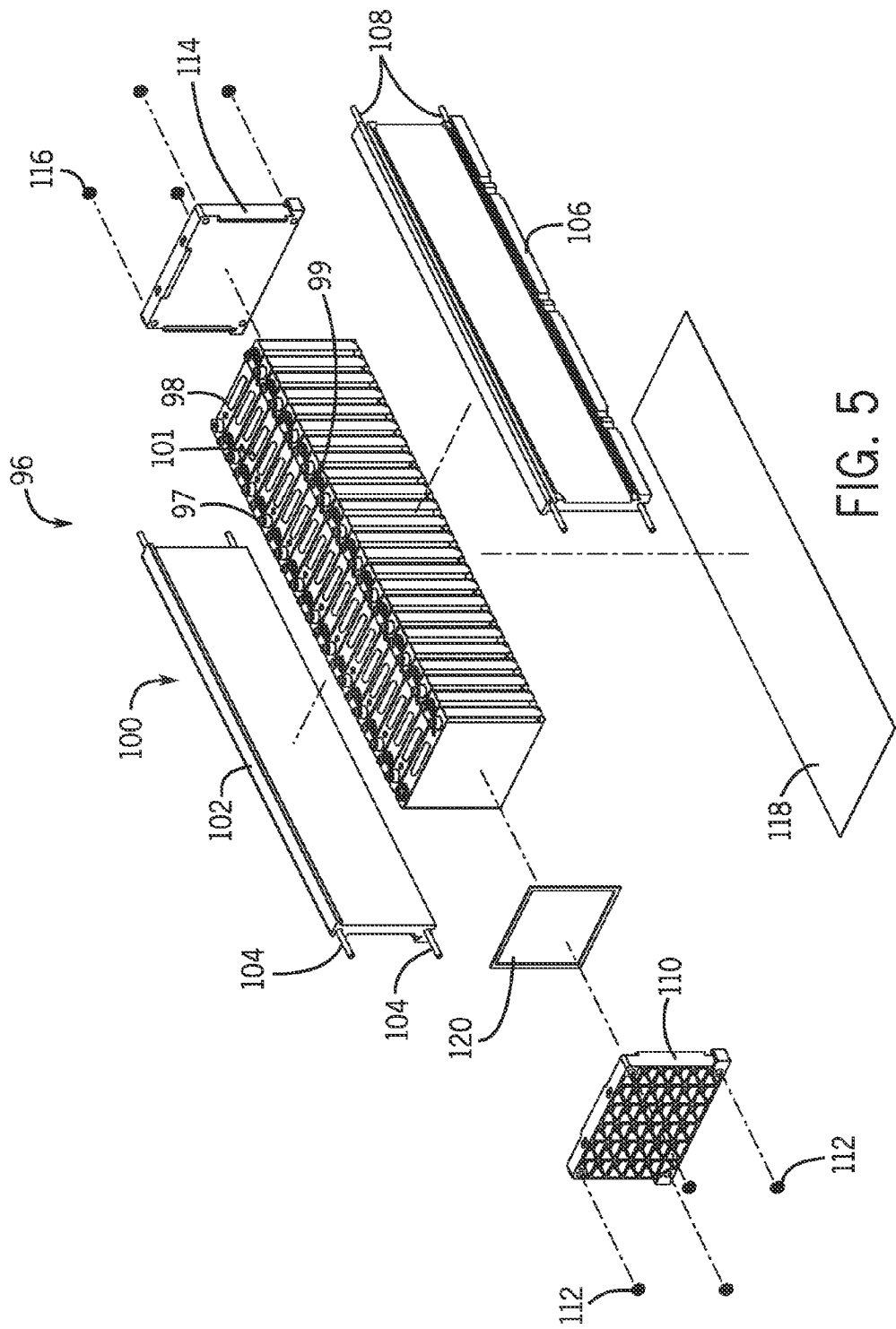
FIG. 5 is a partial exploded view of a battery module for use in the battery system of FIG. 3 in accordance with an embodiment.
Figure 6:
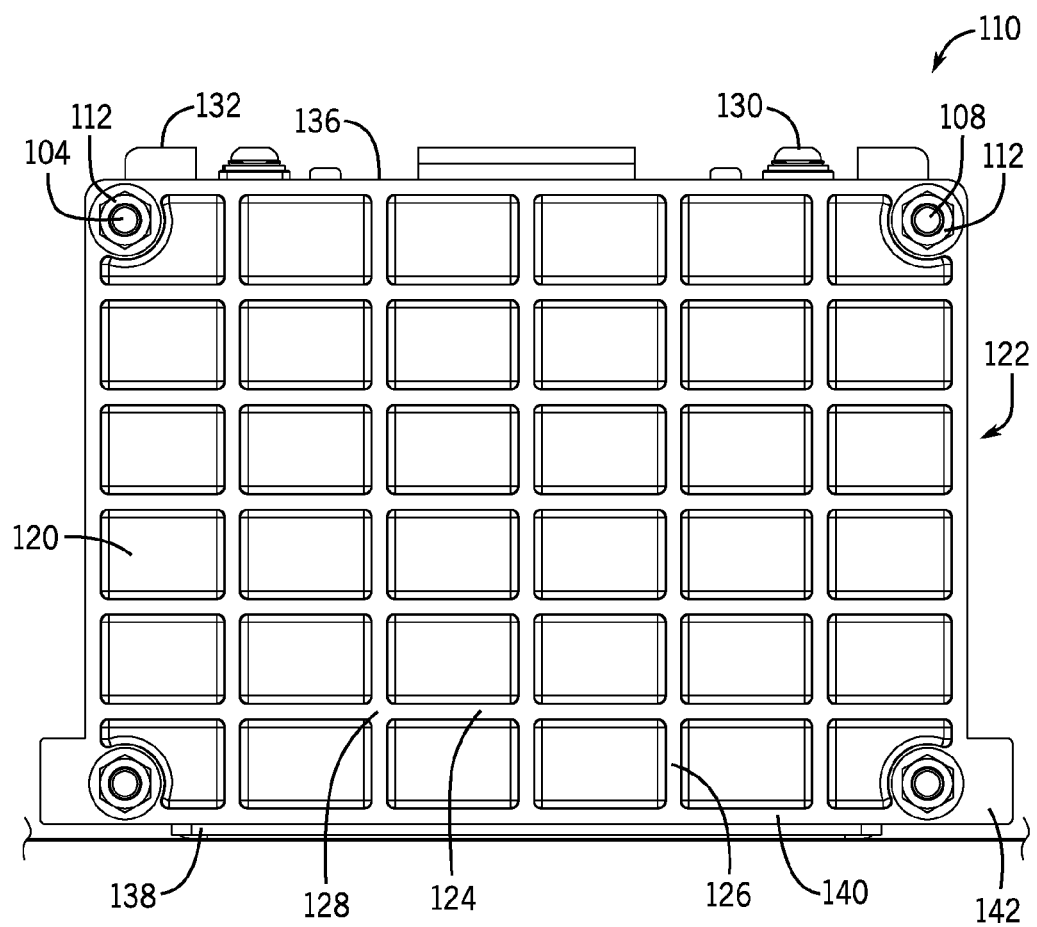
FIG. 6 is an end view of an embodiment of the battery module of FIG. 5.

Turning now to FIGS. 5 and 6, features of an example of an embodiment of a suitable battery module 96, which may be included in the battery system 24 either alone or in combination with other substantially similar battery modules, is illustrated. As shown, the battery module 96 includes electrochemical cells 98 that are contained within a housing 100. The electrochemical cells 98 may be, for example, lithium-ion cells, nickel-metal-hydride cells, lithium polymer cells, etc., or other types of electrochemical cells now known or hereafter developed. According to an embodiment, the cells include at least one terminal, such as positive and negative terminals 97 and 99 and a safety device, such as a vent 101.

According to one embodiment, the electrochemical cells 98 may be generally prismatic lithium-ion cells configured to store an electrical charge. According to other embodiments, the electrochemical cells 98 may have other physical configurations (e.g., oval, cylindrical, polygonal, etc.). Additionally, in some embodiments, the capacity, size, design, and other features of the electrochemical cells 98 may differ from those shown.

The electrochemical cells 98 in the illustrated embodiment are provided side-by-side (face-to-face) one another such that a face of a first electrochemical cell is adjacent a face of a second electrochemical cell (e.g., the cells face one another). According to the illustrated embodiment, the cells 98 are stacked in an alternating fashion such that the positive terminal 97 of the first cell is provided adjacent the negative terminal 99 of the second cell. Likewise, the negative terminal of the first cell is provided adjacent a positive terminal of the second cell. Such an arrangement allows for efficient connection of the cells in series via bus bars. However, the electrochemical cells 98 may be otherwise arranged and/or connected (e.g., in parallel, or in a combination of series and parallel) in other embodiments. Further, in some embodiments, an electrically insulative and/or thermally insulative member may be provided in between adjacent cells (i.e., between the faces).

In the illustrated embodiment, the housing 100 for the electrochemical cells 98 includes a first side bracket 102 having threaded rods 104 and a second side bracket 106 having rods 108. The housing 100 further includes a first end cap 110 secured by nuts 112, a second end cap 114 secured by nuts 116, and an electrical isolator 118. As shown, the end cap 110 is secured to the side brackets 102 and 106 via the threaded rods 104 and 108 and nuts 112. Further, a thermal isolator 120 is provided within the housing 100 adjacent to the electrochemical cells 98.

The end cap 110 provided at the first end of the battery module 96 includes a first or inside face and a second or outside face 120 generally opposite the first face. The first face is generally provided adjacent a face of one of the electrochemical cells, and the thermal isolator 120 is provided between the end cap 110 and the face of the adjacent cell. The end cap 110 in the illustrated embodiment forms a generally rectilinear frame or structure 122.

According to one embodiment, the structure 122 is formed with a plurality of generally horizontal members (beams, ribs, supports, braces, etc.) 124 and a plurality of generally vertical members (beams, ribs, supports, braces, etc.) 126 that intersect at a plurality of intersection points 128. It should be noted that the terms "vertical" and "horizontal" are merely used as terms of reference (in regard to their relation to the vehicle) and that one of ordinary skill in the art would readily recognize that the orientation of the battery module 96 (and of the members) may be different than that shown. Further, it should be noted that in some embodiments, the end cap 110 may contain openings or windows between the horizontal and vertical members 124 and 126.

In the illustrated embodiment, the end cap 110 includes features or bosses 130 that are configured to receive a fastener or tie rod therethrough. As shown in FIG. 6, each of the bosses 130 are located substantially in a corner of the end cap 110. According to one embodiment, nuts are used to tighten the tie rods within the battery module.

According to an exemplary embodiment, as shown in FIG. 7, the battery module 96 also includes a pair of members or structures shown as side clamps 132, which generally correspond to the side brackets 102, 106 of FIG. 5. The side clamps 132 each include a main body having a first or inside surface 133 and a second or outside surface 135 generally opposite the first surface 133. According to an embodiment, the first surface 133 faces the sides or edges of the cells 98 within the battery module 96.

According to one embodiment, a top portion 136 of the first surface of the side clamp 132 includes a feature or member, such as a projection or flange 134. The projection or flange 134 extends out and away from the top portion 136 of the side clamp 132 and extends over at least a portion of the top of the cells 98 to aid in clamping the electrochemical cells 98 in a generally vertical direction. It should be noted that the term "vertical" is merely used as a term of reference (in regard to the relation to the vehicle) and that the orientation of the battery module (and the direction of the clamping force) may be different than that shown.

According to one embodiment, the projection or flange 134 extends out from the top portion 136 of the side clamp 132 in a direction generally perpendicular to the main body of the side clamp 132. A bottom portion of the projection or flange 134 is configured to contact a top portion of each of the cells 98 to hold (e.g., clamp, position, retain, etc.) the cells in place. According to an embodiment, the projection or flange 134 extends all along the side clamp 132 from a first end of the side clamp 132 to a second end of the side clamp 132. According to one embodiment, the inside surface of the main body of the side clamp 132 contacts a side of each of the cells 98 to hold (e.g., clamp, position, retain, etc.) the cells 98 in place.

According to the illustrated embodiment, the top portion 136 includes a groove or slot 142 to hold or retain a threaded rod 144. A bottom portion of the side clamp 132 also has a flange 143 extending out from the second surface 135. The flange 143 is configured to receive a portion of a clamping bar 146 that has projections 148 that are received in a groove or slot 150 formed by a projection 152 of the bottom flange 143 of the side clamp 132.

According to an embodiment, the clamping bar 146 is configured to be bolted or otherwise secured to a housing 154 of the battery system 24 in which the battery module 96 is provided. For example, as shown in FIG. 7, a fastener 156 (e.g., a bolt) is disposed in through holes of the clamping bar 146 and threaded into a weld nut 158 that is coupled (e.g., welded) to the inside surface of a bottom 160 of the housing 154. According to the illustrated embodiment, the clamping bar 146 extends generally the length of the battery module 96. However, according to other embodiments, the clamping bar 146 may not extend the entire length of the battery module 96. According to another embodiment, the clamping bar 146 may include several distinct, individual components.

When the clamping bar 146 is urged toward the bottom 160 of the battery system housing 154 by the fastener 156, the clamping bar 146 exerts a force on the bottom flange 143 of the side clamp 132. This force is translated through the structure of the side clamp 132 to the top flange or projection 134 to exert a clamping force on the top of the cells 98, ensuring that the cells 98 are securely held in the housing 154. In addition, as best seen in FIG. 6, the bottom 138 of the cell 98 extends past the bottom 140 of the end cap 110 and the bottom of the side clamp 132 such that the bottom 138 of the cell 98 is clearly in thermal communication with the internal surface of the bottom 160 of the housing 154 when the clamping force is exerted on the cells 98. This design allows for more robust heat transfer from the cell to the housing (through the bottom of the cell).

It should be noted that in certain embodiments, both the end caps 110 and the side clamps 132 may have dovetail features that are configured to help couple the end caps 110 and side clamps 132 together. Additionally, as shown in FIG. 7, the end cap 110 may have a side flange or projection that is received by an end of the side clamp 132 such that when the side clamp 132 is secured by the clamping bar 146, the side clamp 132 exerts a force (e.g., in a downward direction) on the end cap 110. The end cap 110 may then have a top flange or projection at the top of the end cap that extends out over at least a portion of the adjacent cell 98. By having the end of the side clamp 132 press down on the side flange of the end cap 110, a force may be translated to the cell 98 adjacent the end cap 110 by the top flange of the end cap 110.

According to one embodiment, an electrically insulative member 161 is provided between the bottom 138 of the cells 98 and the inside surface of the bottom 160 of the housing 154. According to this embodiment, the electrically insulative member 161 provides electrical insulation between the cells 98 and the housing 154 but allows thermal transfer to readily occur between the cells 98 and the housing 154.

In one embodiment, the electrically insulative member 161 may be an electrically insulating, yet thermally conductive material (e.g., silicone, polyvinyl chloride (PVC), or other suitable material such as KAPTON®). According to an embodiment, the electrically insulative member has a thickness in the range of approximately 0.05 to approximately 0.25 millimeters. According to another embodiment, the electrically insulative member has a thickness of approximately 0.13 millimeters. However, the thickness of the insulator may be greater or smaller according to other embodiments.

It should be noted that a variety of suitable arrangements may be employed at the interface between the bottom of the cells 98 and the bottom 160 of the housing 154 to enable the transfer of heat from the cells 98 to the thermal management system 46. For example, as shown in the schematic of FIG. 8, in one embodiment, a first thermally conductive pad 90 (or another suitable thermal interface) is positioned between the bottom of the cell 98 and the bottom 160 of the housing 154, and a second thermally conductive pad 90' is positioned between the bottom 160 of the housing 154 and the heat sink 92 of the thermal management system 46.

During use, the thermal conducting pad 90 provides physical contact between the bottom of the cells 98 (or between the electrically insulative member) and the housing 154 to aid in thermal transfer (conductive transfer). For example, the thermal conducting pad 90 may be made of a resilient material such that when the cells 98 are clamped down to the bottom of the housing 154, any gaps (e.g., air gaps) created by irregularities in the bottom of the cells and/or the bottom of the housing (e.g., warpage, unevenness, differently sized cells due to tolerance stack-ups) are taken up (e.g., eliminated) by the thermal conducting pad 90. Having no air gaps between the bottom of the cells and the bottom of the housing ensures efficient conductive thermal transfer. Additionally, the thermal conducting pad 90 may offer some vibrational damping to the cells 98.

According to an embodiment, the thermal conducting pad 90 may be partially or entirely made of a thermally conductive material (e.g., a silicone polymer, an alumina and/or boron nitride filled silicone polymer, or other suitable material). According to an embodiment, the thermal conducting pad 90 is a fiberglass reinforced, highly conformable, low modulus polymer such as Gap Pad 1500R, available from The Bergquist Company, Chanhassen, Minn.

According to an embodiment, the thermal conducting pad 90 has a thickness in the range of approximately 0.10 to approximately 1.50 millimeters. According to another embodiment, the thermal conducting pad 90 has a thickness in the range of approximately 0.2 to approximately 0.5 millimeters. According to another embodiment, the thermal conducting pad 90 has a thickness in the range of approximately 0.3 to approximately 0.4 millimeters. However, the thickness of the thermal conducting pad 90 may be greater or smaller according to other embodiments.

It should be noted that the illustrated embodiments are subject to considerable implementation-specific variations. For example, according to another embodiment, neither the electrically insulative member 161 nor the thermal conducting pad 90 are included within the battery system (i.e., the electrochemical cells 98 are directly in contact with the internal surface of the bottom 160 of the housing 154). According to another embodiment, only the thermal conducting pad 90 is included in the battery system (and not the electrically insulative member 161). According to this embodiment, the thermal conducting pad 90 may act as an electrical isolator and a thermal conductor.

According to another embodiment, a thermal conducting paste, resin, or epoxy (not shown) may be used instead of the thermal conducting pad 90. In this embodiment, the thermal conducting paste is applied to either the bottom of the housing or the bottom of the cells (or both) before the cells (e.g., within the module) are coupled to the housing. The thermal conducting paste is configured to enhance the thermal conductivity between the cells 98 and the housing 154. Additionally, the thermal conducting paste may help to adhere the cells 98 to the housing 154.

FIG. 9 illustrates an alternate embodiment of the battery system 24 in which the housing 154 is modified to include at least one aperture 180 disposed between a first flange portion 182 and a second flange portion 184 of the housing 154. The aperture 180 is dimensioned to receive the module 96 including the cell 98, the thermal gap pad 90, and the heat sink 92. That is, in this embodiment, the module 96 is configured to fit within the aperture 180 such that heat is transferred from the cell 98 to the heat sink 92 via the gap pad 90, thus eliminating the need for heat to be transferred through the housing 154. The foregoing feature may increase the efficiency of the heat transfer process and may provide additional advantages since the module 96 may be removed and transported independent of the housing 154.

It should be noted that a variety of implementation-specific securement mechanisms may be utilized to couple the components of the module 96 together with the housing 154 in certain embodiments. However, in the illustrated embodiment, which is provided as an example, the side clamps 132 and the clamping bars 146 couple the components together. As illustrated, a base 186 of the heat sink 92 includes stepped projections 188 that overlap with the flange portions 182 and 184 of the housing 154.

Figure 10:
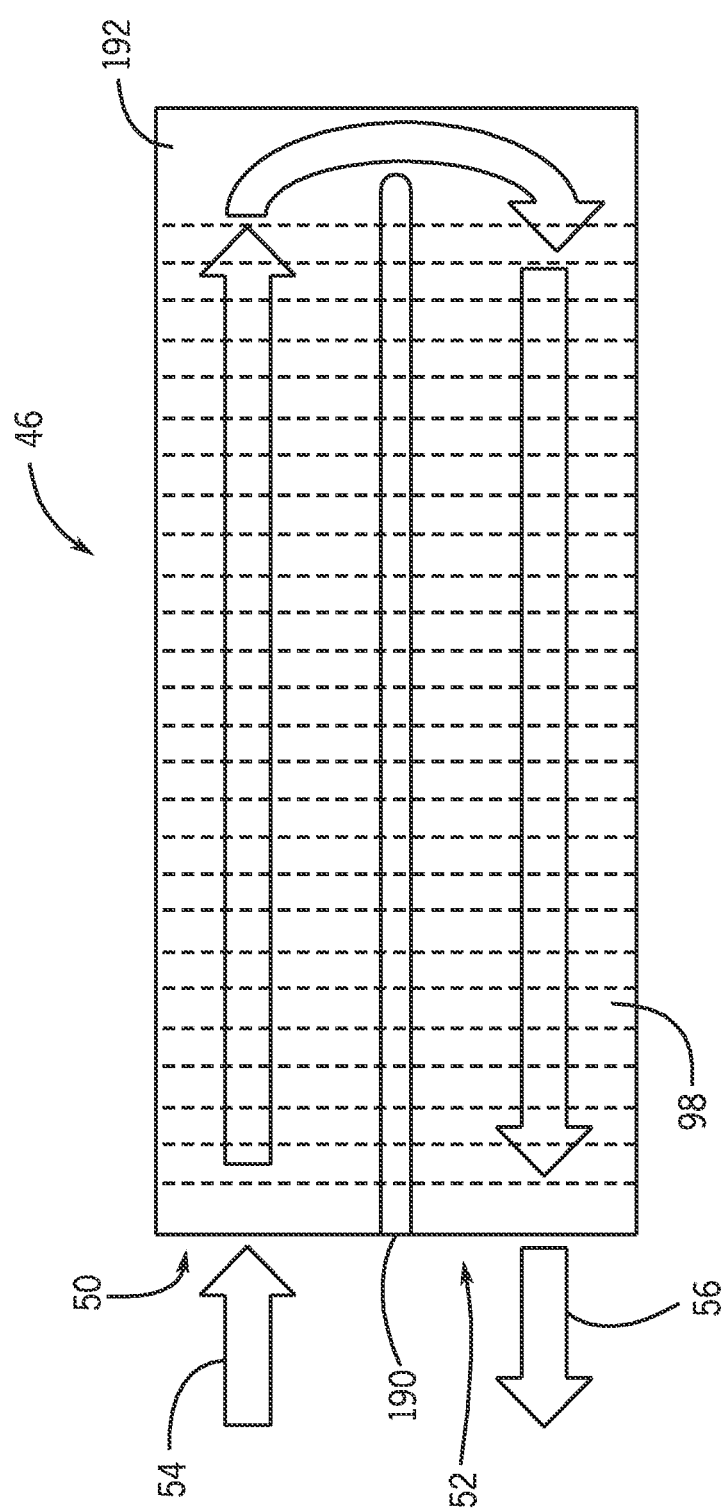
FIG. 10 is a schematic view of fluid flow through one of the thermal management features for the battery system of FIG. 3 according to an embodiment.

As shown in FIG. 10, the thermal management system 46 includes a wall divider 190 to help separate or divide the flow direction of the thermal management fluid through the thermal management system. According to an embodiment, the wall 190 is provided generally in the middle of thermal management device to separate the thermal management device into the first set of passages 50 and the second set of passages 52.

According to one embodiment, a connection member 192 may be provided at one end of the thermal management device to route or direct fluid from the first set of passages 50 to the second set of passages 52. As such, as previously discussed with regard to FIG. 3, an inlet and an outlet are created on the opposite end of the thermal management device. It should be noted that although the inlet is shown on one side of the thermal management device, with the outlet shown on the other side of the thermal management device, the inlet and outlet positions may be switched with one another according to another embodiment.

According to an embodiment, as shown in FIG. 10, the connection member 192 is provided in the thermal management device such that the turn around of the fluid does not occur under the cells. In other words, the connection member 192 is provided just to the end of the last cell in the battery module such that the turnaround of the fluid does not affect the thermal transfer from the cells to the thermal management fluid or device. However, according to another embodiment, the connection member 192 may be provided under the cell or cells at the end of the battery module.

One advantage of having the fluid flow in a first direction through the first set of passages and then in a second direction through the second set of passages is that it allows for more even cooling (or heating) of the cells in the battery module. This helps to result in the cells having a longer life and more even operating characteristics (e.g., voltage, current, charge capacity, etc.) throughout the life of the cell. According to another embodiment, however, the thermal management fluid may enter one end of the thermal management device and exit out the second, opposite end of the thermal management device.

Further, it should be noted that the various components of the thermal management systems and devices are constructed from any suitable materials. For example, the upper and the lower portions, fins, etc. are constructed from a metal such as aluminum (or aluminum alloy), copper (or copper alloy) or steel (e.g., a sheet steel). According to other exemplary embodiments, the various components of the thermal management features are constructed from any other suitable materials (e.g., a polymeric material).

According to another embodiment, the thermal management system 46 for the battery system 24 may include a series of conduits or tubes 200. Each tube 200 includes a hollow passage 202 configured to receive a thermal management fluid (e.g., gas or liquid) to flow therethrough to cool (or heat) the cells provided within the battery module within the battery system. According to an embodiment, the tubes 200 are coupled to the housing 28 of the battery system 24, e.g., by welding, with fasteners, clamps, an adhesive, or other suitable means.

Figure 12:
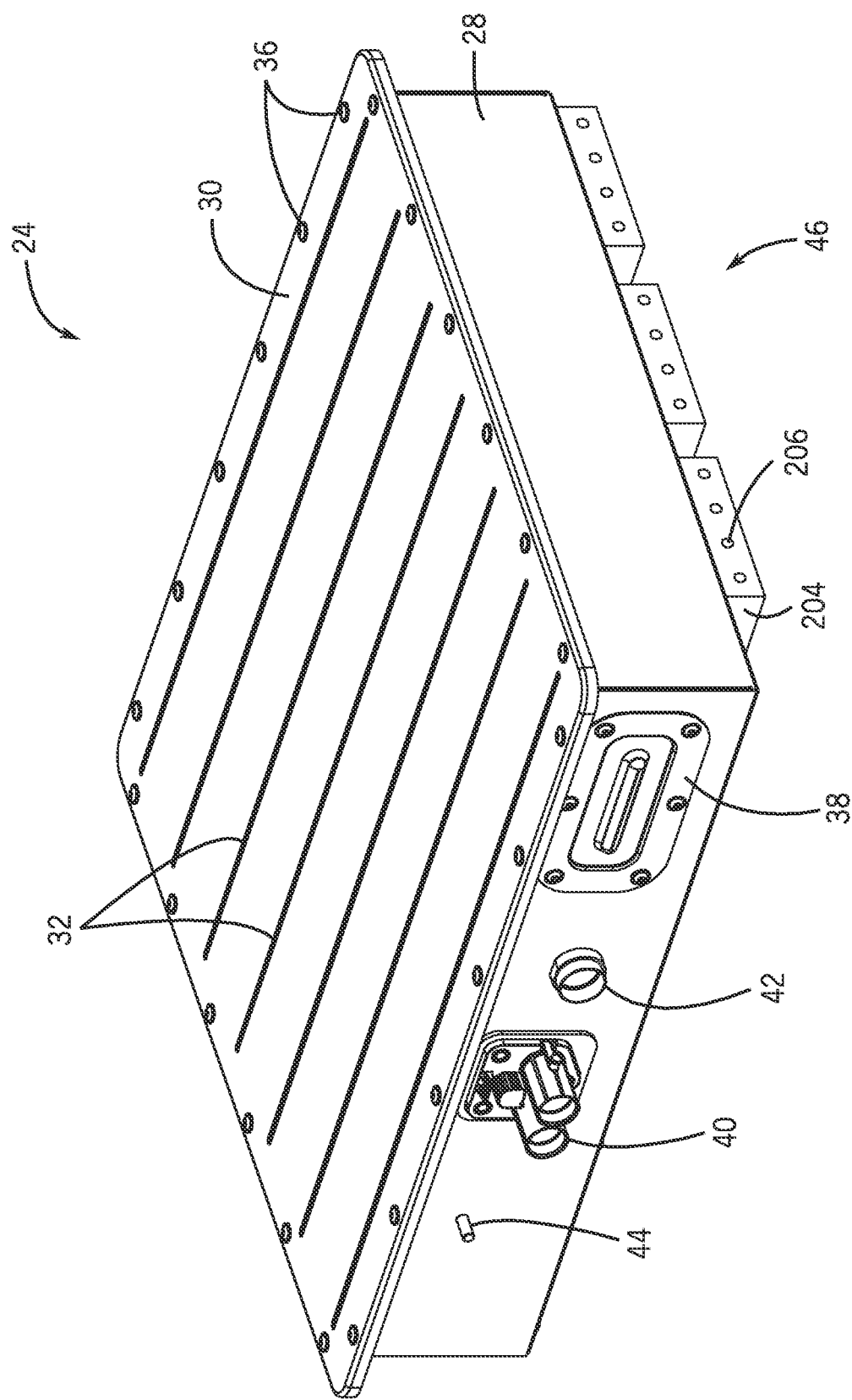
FIG. 12 is a perspective view of the battery system of FIG. 3 having thermal plates with passageways disposed therein according to another embodiment.

According to another embodiment, as shown in FIG. 12, a thermally conductive plate 204 includes at least one internal passage or channel 206. The internal passage or channel 206 is configured to receive a thermal management fluid (e.g., gas or liquid) to flow therethrough to cool (or heat) the thermally conductive plate 204 (and the cells provided within the battery system housing).

Figure 11:
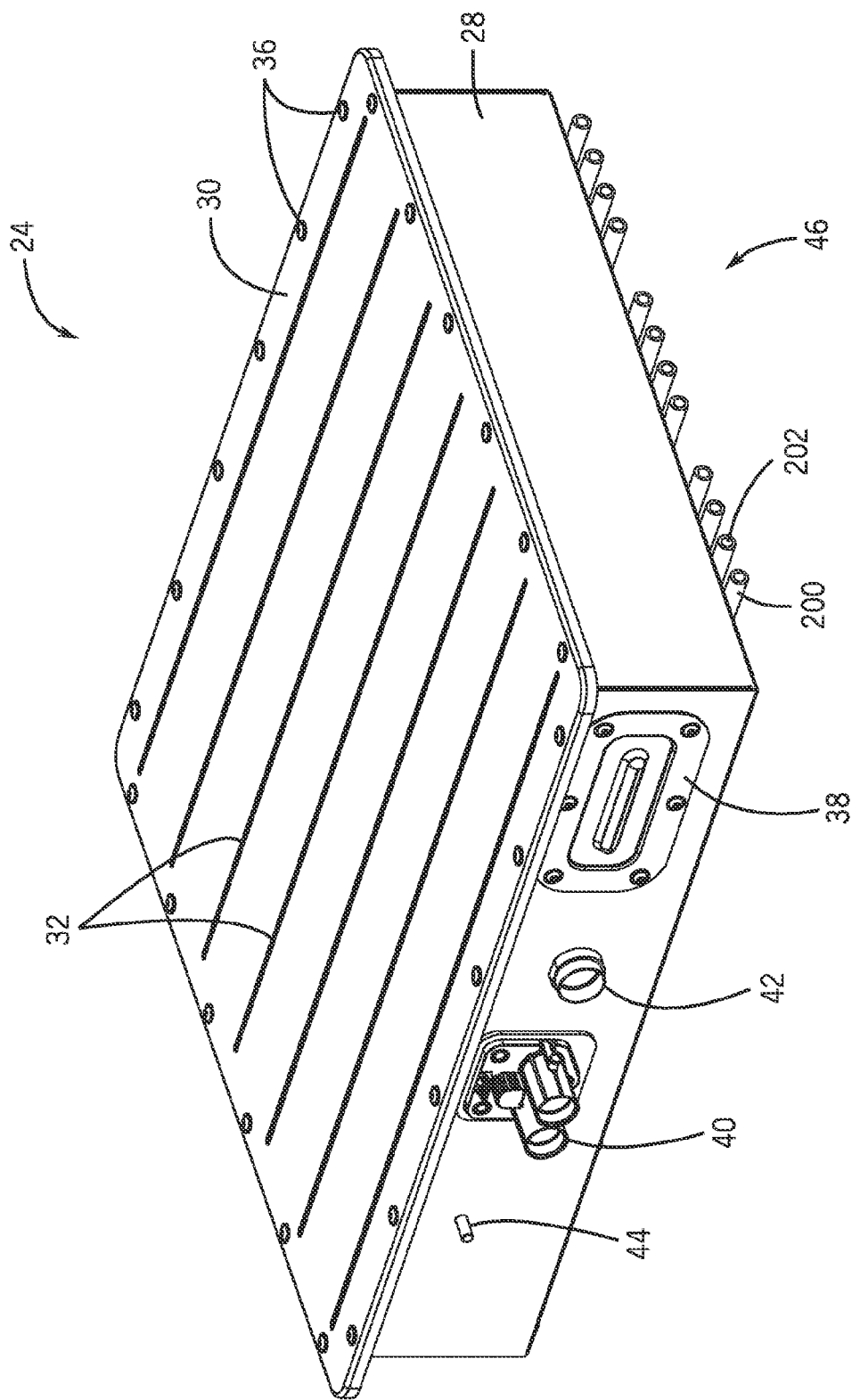
FIG. 11 is a perspective view of the battery system of FIG. 3 having thermal management tubing according to another embodiment.
Figure 13A:
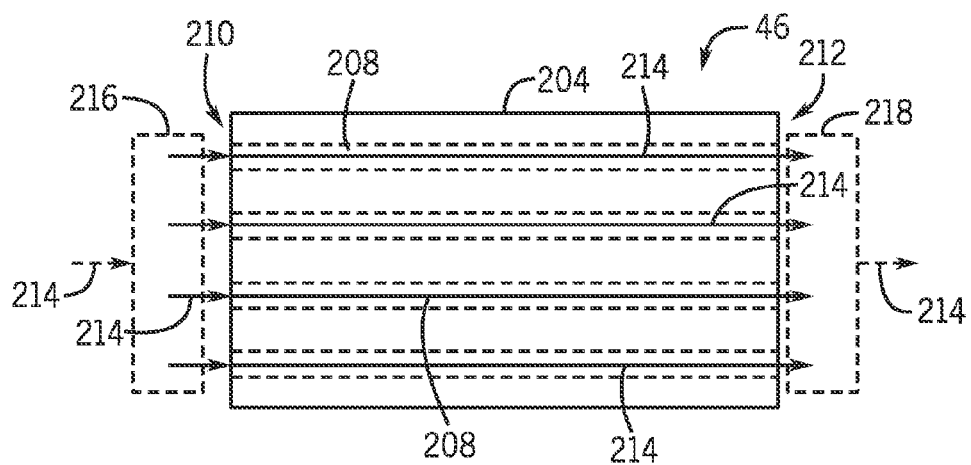
FIG. 13A is a schematic illustrating an example view of fluid flow through the thermal management features of the battery systems of FIGS. 11 and 12 according to an embodiment.

As shown in FIG. 13A, according to an embodiment, the thermal management system 46 may include four tubes having passages 208 (e.g., as shown in FIG. 11) or four channels (e.g., as shown in FIG. 12). According to other embodiments, the thermally conductive plate 204 may include a greater or lesser number of tubes or channels, depending on the desired cooling (or heating) requirements of the application.

According to an embodiment, the thermal management fluid enters the passages or channels 208 at a first end 210 of the thermal management system 46 and exits the passages or channels 208 at a second end 212 of the thermal management system 46 opposite the first end 210 of the thermal management system 46. As such, the fluid flows from an inlet or first side 210 of the thermally conductive plate 204 to an outlet or second side 212 of the thermally conductive plate 204, with all of the fluid flowing in the same direction (e.g., in a generally parallel fashion), as indicated by flow arrows 214.

As shown in FIG. 13A, an inlet manifold 216 may be provided adjacent the inlet side 210 of the passages or channels 208 to supply the fluid from a single source to the multiple passages or channels 208. Similarly, an outlet manifold 218 may be provided adjacent the exit side 212 of the passages or channels 208 to collect the fluid from the multiple passages or channels 208.

Figure 13B:
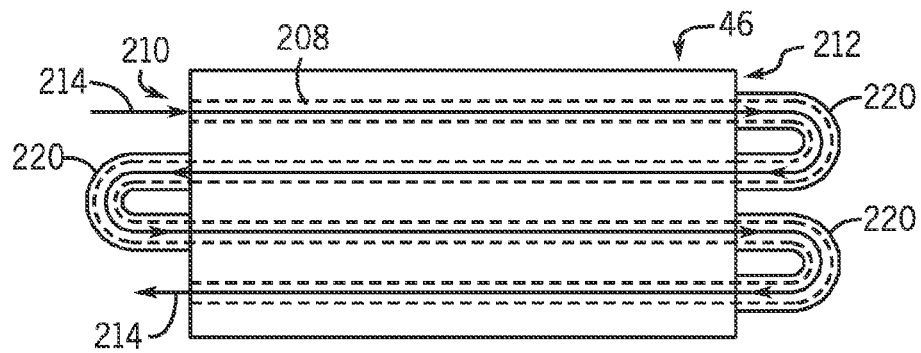
FIG. 13B is a schematic illustrating an example view of fluid flow through the thermal management features of the battery systems of FIGS. 11 and 12 according to another embodiment.

According to another embodiment, as shown in FIG. 13B, the individual passages or channels 208 may be interconnected to one another by members shown as connection members 220. The connection members 220 have an internal passage 208 that directs fluid from a first passage or channel to a second passage or channel. As such, the fluid flows from an inlet or first side 210 of the thermal management system to a second side 212 of the thermal management system, and then is routed back to the first side 210 of the thermal management system via the connection member 220. The fluid may cycle from one end of the thermal management system to the other end of the thermally conductive plate and continue back and forth in a winding or serpentine manner as shown by arrows 214 in FIG. 13B with the inclusion of multiple connection members 220. Additionally, as shown in FIG. 13B, the fluid changes directions via the connection members 220 at a point outside the main body of the thermal management system 46 (e.g., at a point that is not directly underneath the cells in the battery module). According to another exemplary embodiment, as shown in FIG. 13C, the fluid changes direction inside the external perimeter of the thermally conductive plate via curved channels.

Figure 13C:
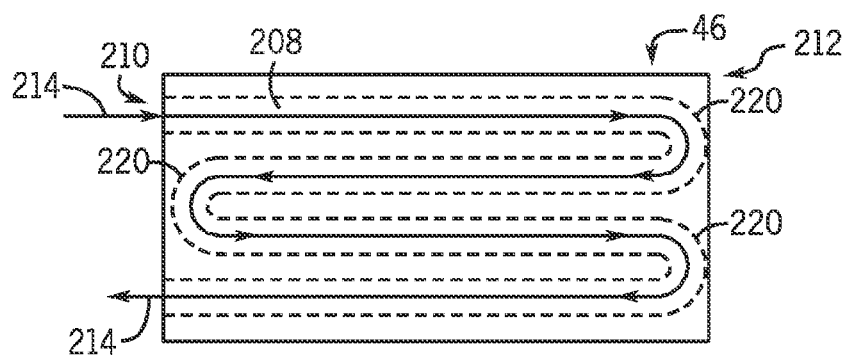
FIG. 13C is a schematic illustrating an example view of fluid flow through the thermal management features of the battery systems of FIGS. 11 and 12 according to a further embodiment.

As shown in FIG. 13C, the connection members 220 are 180° bends or turnarounds inside the external perimeter of the thermal management system 46. As shown in FIGS. 13B and 13C, both the inlet and the outlet for the fluid are located on the same end or side of the thermal management system 46. According to another embodiment, the inlet and outlet may be on different ends or sides of the thermal management system 46.

It should be noted that the manifolds 216 and 218 shown in FIG. 13A and connection members 220 shown in FIGS. 13B and 13C may be used with both the external tubes having passages or the thermal plates having internal passages. Further, it should be noted that the tubes and/or thermal plates may be made of a thermally conductive material (such as, e.g., aluminum (or aluminum alloy), copper (or copper alloy), steel, or other suitable material). According to an embodiment, the tubes or thermal plates are coupled to the bottom portion of the housing by welding (e.g., laser welding), paste, or adhesive.

According to an embodiment, the bottom of the housing of the battery system is relatively a smooth, flat surface. However, according to another embodiment, the bottom of the housing of the battery system is configured with a step or transition to create a shortened or reduced height section of the housing of the battery system. In such embodiments, the thermal management system may be provided underneath the housing of the battery system in this reduced height section.

According to another embodiment (not shown), a battery system may include a thermal management device within the battery system in addition to a thermal management device outside of the battery system (e.g., any of the thermal management features described above). For example, an internal thermal management feature including a heat sink or heat exchanger (e.g., air-to-air heat exchanger) may be provided within the battery system directly above the external thermal management system. In this embodiment, the cells of the battery module may be placed on the internal thermal management feature to increase the amount of thermal transfer to/from the cells. According to this embodiment, a fan or pump may be included within the battery system to help circulate air within the battery system (and through the internal thermal management system).

Each of the battery systems shown and described herein include a thermal management system having thermal management features that are provided completely external to the housing of the battery system. Having the thermal management features external to the housing of the battery system allows for proper thermal management of the system (e.g., cells), but also isolates the thermal management fluid from any gases and/or electrolyte that may be vented from the cells within the system. Hence, in the case of cell venting, the vehicle cabin air is not mixing with the vented gas and/or electrolyte. Additionally, in the case of a liquid thermal management fluid, the failure mode of liquid leaking into the battery chamber and high voltage areas may be reduced or eliminated.

Additionally, it should be noted that all of the possible variations and alternatives shown and described herein may apply to any and all of the separate embodiments included in this application.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the battery system having an external thermal management system as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

The invention claimed is:

1. An xEV electric vehicle battery system, comprising:
   a battery system housing with a bottom plate having one or more apertures; and
   a battery module disposed in an aperture of the one or more apertures, comprising:
   a battery module housing;
   a heat sink disposed proximate the aperture and under the battery module housing;
   at least one prismatic electrochemical cell disposed within the battery module housing above the heat sink and within the aperture of the bottom plate of the battery system housing, wherein the at least one prismatic electrochemical cell comprises terminals extending from a top surface of the at least one prismatic electrochemical cell; and
   a thermal interface layer having a first side in contact with a bottom surface of the at least one prismatic electrochemical cell and a second side substantially opposite the first side in contact with the heat sink, wherein the bottom surface of the at least one prismatic electrochemical cell is disposed generally opposite from the top surface, and the thermal interface layer is configured to enable heat transfer from the bottom surface of the at least one prismatic electrochemical cell to the heat sink; and a clamping system having a clamping bar and at least one side clamp, wherein the clamping bar is configured to exert a clamping force to clamp the at least one prismatic electrochemical cell to the heat sink via the at least one side clamp, wherein the at least one side clamp is a part of the battery module housing, wherein the clamping system comprises a weld nut positioned on the heat sink and a fastener disposed through a hole in the clamping bar and threaded into the weld nut to couple the clamping bar to the heat sink, and wherein the fastener is configured to urge the clamping bar downwardly toward the heat sink as the fastener is tightened into the weld nut.

2. The battery system of claim 1, wherein the heat sink comprises a pair of extensions, each extension being configured to overlap with a portion of the the bottom plate and to be secured to the portion of the bottom plate via a securement mechanism.

3. The system of claim 2, wherein the securement mechanism comprises at least one joint fastener.

4. The system of claim 1, wherein the thermal interface layer comprises an electrically insulative and thermally conductive material.

5. The system of claim 4, wherein the thermal interface layer comprises silicone, polyvinyl chloride, or a combination thereof.

6. The system of claim 1, wherein the thermal interface layer comprises a silicone polymer, an alumina filled silicone polymer, a boron nitride filled silicone polymer, or a combination thereof.

7. The battery system of claim 1, wherein the clamping bar is configured to couple a side of the battery module to a side of an adjacent battery module, wherein the clamping bar is disposed directly between the side of the battery module and the side of the adjacent battery module.

8. The battery system of claim 7, wherein the clamping bar comprises projections configured to be received in grooves formed in the at least one side clamp of the battery module housing and a corresponding side clamp of a battery module housing of the adjacent battery module.

9. The battery system of claim 1, wherein the clamping bar extends along an entire length of the battery module.

10. The battery system of claim 1, wherein the heat sink is separate from and external to the at least one prismatic electrochemical cell such that gas vented from the at least one prismatic electrochemical cell is isolated from a cooling fluid in the heat sink.

11. The battery system of claim 1, wherein the thermal interface layer is conformable such that irregularities in the bottom of the at least one prismatic electrochemical cell are taken up by the thermal interface layer.

12. The battery system of claim 1, wherein the at least one side clamp comprises an upper projection in contact with the top surface of the at least one prismatic electrochemical cell and a bottom projection in contact with a projection of the clamping bar, and the upper projection is configured to exert a force against the top surface of the at least one prismatic electrochemical cell to clamp the at least one prismatic electrochemical cell against the heat sink when the clamping bar is urged downwardly toward the heat sink.

13. The battery system of claim 12, wherein the battery module comprises a plurality of prismatic electrochemical cells including the at least one prismatic electrochemical cell, and the heat sink is clamped to the plurality of prismatic electrochemical cells via at least the pair of side clamps, the thermal interface layer is in contact with each prismatic electrochemical cell of the plurality of prismatic electrochemical cells at its first side, and the thermal interface layer is configured to conduct heat from the plurality of prismatic electrochemical cells to the heat sink.

* * * * *